United States Patent [19]

Stromsta et al.

[11] 4,214,287
[45] Jul. 22, 1980

[54] NOVEL TSF HEAD PAIR FOR DUAL RECORDING ON FLEXIBLE DISKS

[75] Inventors: Roger R. Stromsta; Marshall R. Nathanson, both of Thousand Oaks; Dennis S. Morton, Simi Valley, all of Calif.

[73] Assignee: Burroughs Corporation, Detroit, Mich.

[21] Appl. No.: 926,429

[22] Filed: Jul. 20, 1978

[51] Int. Cl.² .............................................. G11B 5/60
[52] U.S. Cl. .................................... 360/103; 360/122; 360/130.3
[58] Field of Search ............... 360/103, 130, 104, 122, 360/99

[56] References Cited

U.S. PATENT DOCUMENTS

| 3,657,710 | 4/1972 | Billawala | 360/103 |
| 3,821,813 | 6/1974 | Freeman et al. | 360/103 |
| 3,823,416 | 7/1974 | Warner | 360/130 |
| 3,855,625 | 12/1974 | Garnier et al. | 360/103 |
| 3,927,252 | 12/1975 | Polley | 360/103 X |
| 4,081,846 | 3/1978 | Roscamp et al. | 360/103 |
| 4,097,909 | 6/1978 | King | 360/122 X |
| 4,123,791 | 10/1978 | Rotter et al. | 360/122 X |

OTHER PUBLICATIONS

IBM/TDB, vol. 18, No. 12, May 1976, pp. 4112–4114, "Head Compliance System . . . ", by King et al.
IBM/TDB, vol. 20, No. 3, Aug. 1977, p. 1202, "Trirail Slider . . . ", by McWhinney.

Primary Examiner—John H. Wolff
Attorney, Agent, or Firm—John J. McCormack; Nathan Cass; Kevin R. Peterson

[57] ABSTRACT

Embodiments include flying "catamaran" heads with "TSF" rail-faces, consisting of a flat-taper segment and an adjoining "spherical-flat" segment, adapted to eliminate "pinch-off" instability and the like when flown on opposing sides of a flexible medium.

15 Claims, 9 Drawing Figures

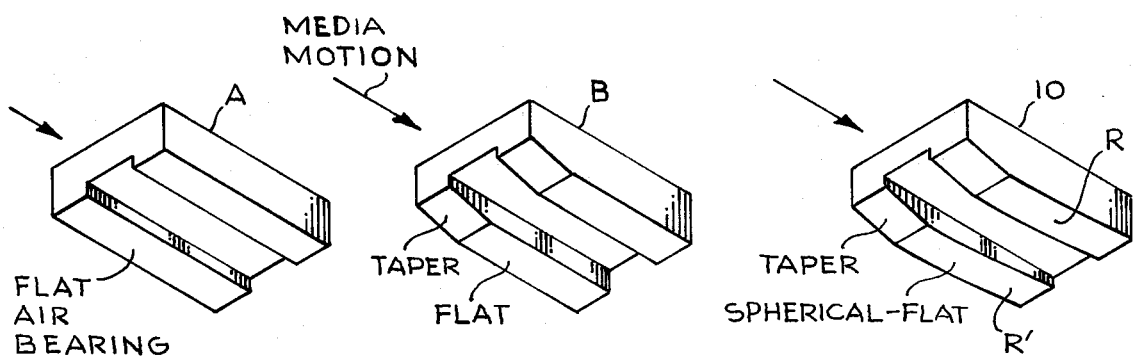
Fig. 1 PRIOR ART  Fig. 2 PRIOR ART  Fig. 3 ("TSF")
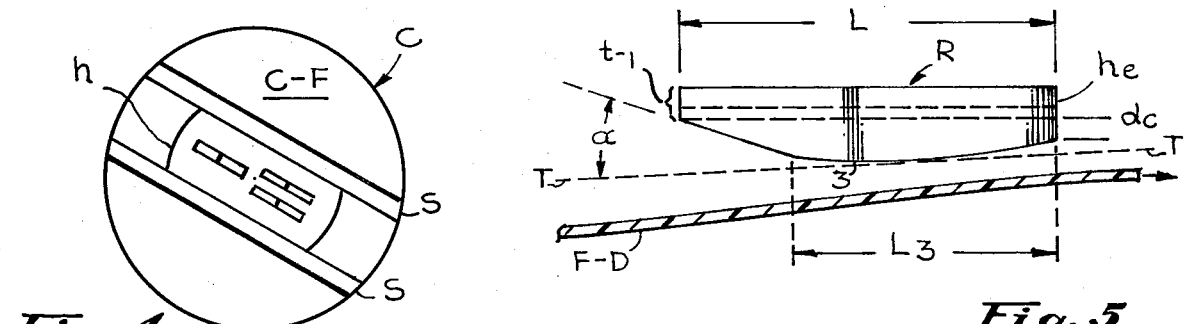
Fig. 4 PRIOR ART  Fig. 5
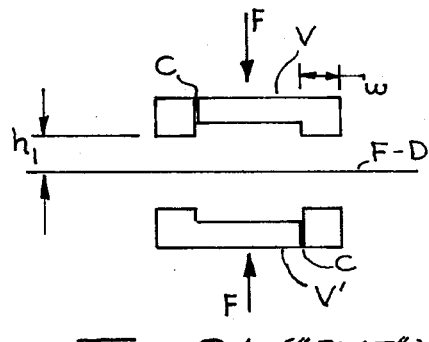
Fig. 8A ("FLAT")
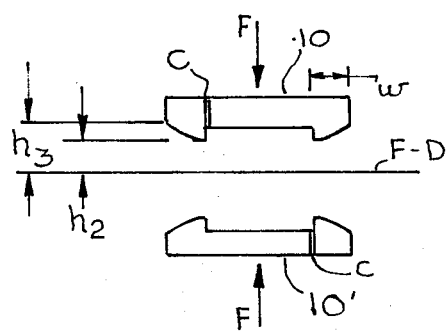
Fig. 8B ("TSF")
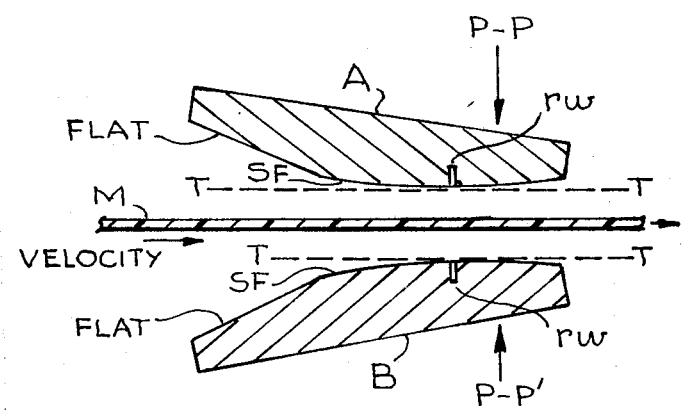
Fig. 6  Fig. 7  Fig. 9

NOVEL TSF HEAD PAIR FOR DUAL RECORDING ON FLEXIBLE DISKS

INTRODUCTION

This invention relates to improved magnetic recording transducers for flexible media, and more particularly to a novel recording face configuration for recording on opposing sides of such disks.

BACKGROUND, FEATURES OF INVENTION

Magnetic recording systems using transducer heads that fly on an air-bearing film above magnetic recording media are well known in the art. Workers have developed and are continuing to develop such heads—for instance, enabling them to fly at a head spacing, between the transducer gap and the recording medium surface that is smaller and smaller—today, quite commonly reduced to as little as a few microinches. Such miniscule head spacing obviously complicates other problems, such as head stability (especially with a medium passing at very high speeds, and even more especially using flexible media such as floppy disks).

Also, flexible magnetic recording disks (floppy disks) are being used more and more, especially for data storage in data processing systems; such disks are relatively inexpensive compared to the more conventional rigid disk. Also it is commonly advantageous today to record on both (opposite) sides of such floppy disks as a means of optimizing the data storage capacity.

However, while transducer heads have become quite sophisticated and well developed as regards their use with rigid disks, the floppy disk recording art is considerably newer and less advanced. Many workers originally tried to employ transducer heads suitable for recording with hard disks when turning to floppy disk recording—however, as most have now discovered, this is not really possible because of the differences in the media characteristics. Such differences become magnified when there is any question of head-disk stability because of the very flexible character of the rapidly spinning floppies; and are even further exaggerated when "opposed recording" (with opposed heads on opposite side of a spinning floppy disk) is attempted, as can be imagined. This is further discussed below. This invention is intended to meet such difficulties by providing transducer head-recording-faces of a prescribed configuration especially adapted for such opposed recording with flexible media. An example of one magnetic recording head structure for such "dual sided" (not opposed) recording may be found in U.S. Pat. No. 4,074,331 to O'Reilly, et al. issued Feb. 14, 1978.

Some workers have believed that the instability of flat pivoted sliders would be cured somewhat using a convex slider face (e.g., see IBM Journal July 1959 pp 260 et seq.). However, no limits were ever appreciated (e.g., whether cylindrical or spherical; if spherical-convex, what radius limits); nor was any relation ever appreciated between spherical type faces and an "entry-taper", especially with respect to flexible media like floppy disks. Such is the thrust of this invention wherein an improved, more stable opposed-head relationship with an intermediate flexible disk is taught by using a prescribed "TSF" head-face configuration.

That is, this invention relates to an improved magnetic recording head especially adapted for dual-sided, directly-opposed, recording on flexible disks (e.g., rotated at 0–1000 rpm) having an improved "catamaran" recording face with rail faces characterized here as "tapered-spherical-flat" (TSF) air bearings. This TSF configuration will be seen to eliminate instabilities associated with conventional "flat" and "taper-flat" catamaran faces, as well as producing other advantageous features and characteristics.

Workers are familiar with the "flat air-bearing" (FIG. 1) and the "taper-flat" air bearing (FIG. 2) configurations of the (catamaran rails of) conventional known recording face configurations for non-contact recording on disk media. FIGS. 1 and 2 indicate these rather schematically. Also, a "taper-flat" configuration is indicated, for example, in U.S. Pat. No. 3,823,416 to Warner, issued July 9, 1974. This patent shows a magnetic head assembly apparently adapted for use with rigid magnetic disks, being thrust into contact therewith at times and flown over the disks at times. In this patent, a magnetic slider body is shown including three spaced "rails" with the bottom surfaces of the two outboard rails forming a "taper-flat" air-bearing surface. A magnetic core is longitudinally aligned with the center rail so as to define the transducing gap, this gap located at the "roll axis" so as to maintain the gap at substantially constant spacing from the recording surface, even during rolling motions of the assembly. Such "catamaran" structures are typically adopted to "bring one closer to the media". While they have found considerable success with rigid media, the "taper flat" catamaran faces presented grave difficulties when used with flexible media such as a floppy disk. This invention is particularly adapted to providing such "taper-flat" air-bearing surfaces with a relatively flat (very large radius) spherical (or cylindrical) surface particularly adapted for using such heads in opposed relation about a passing floppy disk in dual-sided recording.

Workers are also familiar with spherical recording faces (air-bearing surfaces) characteristic of "button" heads such as schematically indicated in FIG. 4. Such a conventional spherical head C will be understood as exhibiting a spherical recording face C-F characterized by a relatively "small radius", on the order of 2–10 inches. Head C includes a transducer insert h, positioned between a pair of conventional parallel, spaced slots S (here, insert h includes three transducer core-inserts as is known in the art). Such spherical heads are known to be relatively stable when used for recording on floppy disks (unlike a catamaran head); however, they cannot be used in "directly-opposed" relation for "dual-sided" recording, but require an opposing felt pad or the like (e.g., a resilient backing plate for single side recording). That is, as workers know, two conventional button heads cannot be used "directly opposed" for "dual-sided" recording. Their sharp curvature also shifts the read/write element away from the low-flying "tangency point" too readily. This sharp curvature (as opposed to a relatively "flat spherical" curvature with a radius of several hundred inches or more) can also interrupt flying, tending to induce a rubbing, contact with the medium. For example, using such a head with a radius of about two inches, displacing the R/W gap only about 6 mils away from tangency with the medium, will increase the flying height about 10 microinches, or 10 minutes of arc—an impossible shift for acceptable recording as workers well know. Button heads are workable only when backed up by a compliant, soft surface which can mold the passing flexible disk around the head. One can use two such button heads for "dual-side" recording, but they must be staggered and cannot be opposed because of this "back-up" requirement.

The present invention differs from these known recording face configurations in that it is characterized by a pair of catamaran rails which are not only tapered, but are "spherical-flat", rather than simply "flat"—as is illustrated for the TSF faces of the side rails of the embodiment 10 in FIGS. 3 and 5. Moreover, unlike "spherical" head-faces, this "spherical-flat" rail face is characterized by a relatively "large" radius (about 100 to 1000 inches) and hence are styled "spherical-flat" rather than simply "spherical"—as opposed to the conventional "small" (e.g., 2-10 inch) radius for spherical (non-catamaran) heads familiar to workers in this art. Such a TSF face is new in the art.

Such a "TSF" air-bearing surface will be recognized as quite advantageous as compared with conventional "flat" and "taper-flat" air-bearings, eliminating certain instabilities associated with these—and in fact represent the first genuinely stable catamaran head configuration for non-contact magnetic recording on flexible disk media.

Typical problem: "pinch-off":

FIGS. 6 and 7 are illustrative of how a pair of such TSF recording faces according to the invention operate, in "dual-side recording", with superior stability and other characteristics vs. conventional flat or taper-flat recording faces. Thus, in FIG. 6, a flexible disk segment F-D will be understood as passing, at a prescribed operating velocity, between a pair of conventional "flat" air-bearing heads A, A', each face being tilted at a prescribed divergent angle with respect to the reference plane (RF—RF) along which the disk is, ideally, to be presented. Workers will recognize that such a flexible disk will often experience undulations, as pictured, and that centering of the head pair relative to the disk may not be perfect—with the result that an undesirable "pinch-off" can occur—this intermittently closing-off, then opening-up, the "throat" (or entry inlet) between the recording faces. This will also occur with taper-flat faces. Such a "pinch-off" leads to undesirable high frequency vibrations of the disk and to unacceptable variations in flying height. These will degrade, or destroy, the desired recording performance.

With a pair of TSF recording faces according to the invention, on the other hand, as illustrated in FIG. 7, such a "pinch-off" will normally not occur at all. That is, the "taper-spherical-flat" air-bearing faces (of the catamaran rails) are observed to be considerably more stable—evidently because of the combined effects of the "entry taper" and of the spherical-flat face presented. The spherical-flat is found necessary (at least at the forward end of the rail)—along with the entry taper, to avoid "pinch-off" effects.

It is speculated that the SF faces maintain a slight Bournoulli film on (both sides) of the disk at all times. While the SF configuration is necessary along the forward half of the rail, it is also preferable to provide it relatively symmetrically along the aft end of the rail as well since an "aft SF face" appears to create a slight head/disk suction. It is noted that the very slight curvatures on such an SF face have been instrumental in eliminating "bistable" air-bearing behavior—that is, a random positioning of a head surface at two different flying heights for a given load, as mentioned above.

In any event, such a pair of TSF faces is observed to eliminate inlet "pinch-off" and permit and extremely stable air-bearing/disk spacing, as well as—most desirably—accommodating a closer head-disk spacing, with consequent improved read/write characteristics, especially at high bit densities. Similar results are observed where a single head (with back-up plate, etc.; and "single-side" recording) is likewise provided with a TSF face.

This will be surprising to workers, especially in view of the very slight curvature (large radius) placed on the "spherical-flat" rail faces.

Also surprising, it is found that such a TSF head can be made to "fly" above flexible media at "moderate" media speeds (e.g., 75-300 ips vs. the usual 1000+ips with heads on rigid disks), dropping into media contact at about 20-25 ips (for embodiment detailed here). Unlike conventional "spherical" heads, such TSF heads may be fashioned into a catamaran face and may be opposed directly about the passing media. A pair of opposed bearings that are "highly spherical", in the conventional sense (e.g., the order of a 2-10 inch radius), can in no way give such results:—in fact they are unworkable with flexible media.

And unlike the well-known flat heads used with floppy disks, the TSF head exhibits no disturbing "spacing bistability" (e.g., assuming one-unit spacing at attack angle aa; but ten unit spacing at adjacent angle bb—or "hunting" therebetween, as mentioned above).

BRIEF DESCRIPTION OF THE DRAWINGS

These and other features and advantages of the present invention will be appreciated by workers as they become better understood through reference to the following detailed description of the presently preferred embodiments, which should be considered in conjunction with the accompanying drawings, wherein like reference symbols denote like elements:

FIG. 1, a lower perspective view, simplified, of a prior art recording head characterized by catamaran rails exhibiting a "flat" air-bearing surface;

FIG. 2, a similar view of a similar prior art head having rails with taper-flat air-bearing surfaces;

FIG. 3, a similar view of a like recording head having rails with a "taper-spherical-flat" surface according to one embodiment of the invention;

FIG. 4, a simplified plan view of a prior art spherical recording head face;

FIG. 5, a side view of an embodiment like that in FIG. 3 indicating a TSF rail surface confronting a passing flexible disk segment;

FIG. 6, a side view, greatly simplified, of a pair of opposed prior art recording heads with "flat" air-bearing surfaces and an intermediate passing flexible disk segment, and FIG. 7, a like view of a pair of similar heads including TSF configuration according to the invention;

FIG. 8A, a front schematic view of a pair of flat, or taper-flat, sliders confronting a flexible disk, as compared with a pair of "TSF-configured" sliders (FIG. 8B) illustrating reduced slider-disk spacing (with equal loads and rail widths, etc.); and FIG. 9, an illustration after the manner of FIG. 5 indicating a pair of directly opposed TSF rail faces, with the placement of the read/write element and positioning forces schematically indicated.

DESCRIPTION OF PREFERRED EMBPDIMENT

FIGS. 3 and 5 indicate a preferred embodiment of the invention, namely a "non-contact" ("flying") TSF catamaran recording head 10 understood as adapted for "head-opposed", dual-sided recording on flexible disks. Such a head is characterized by a pair of opposed catamaran rails R, R' each having a TSF recording face. Thus, each rail face will be understood as including a flat, bevel segment 1 adjacent the toe edge t of the head 10. Bevel 1 will be seen as merging into a "spherical-flat" (medium-confronting) segment 3, extending from the bevel 1 at least mid-way along the remaining rail-length—and preferably to the heel-edge he of the head (one rail being indicated in FIG. 5 in side elevation, and shown in typical recording orientation relative to a flexible disk segment FD, passing as indicated by the arrow). Other materials, dimensions, fabrication and operating characteristics of this, and other, embodiments will be understood as conventional as known to workers in the art.

The following exemplary dimensions, for this embodiment, may help in understanding the invention:

| head, overall length: | 0.25" |
|---|---|
| , overall width: | 0.15" |
| , thickness: | 0.05–0.10" |
| each rail: | .02–.04" wide with separation channel .05" × .01" maximum |

The head will, in general, be constructed of a ferro-ceramic material lapped "ultra-smooth" (i.e., less than 1 $\mu$-in. AA roughness). Other hard, smooth wear-resistant materials may occur to workers.

More particularly, each rail will include a spherical-flat surface 3 about 0.19 inches long with a radius of 100 to 1000 inches (preferably about 400 inches) and a flat bevel 1 about 0.04 inches long and tapered at about 0.5 degrees (angle $\alpha$, FIG. 5) with respect to the mid-point tangent T—T to the "spherical-flat" surface 3.

Results:

The results with using a pair of TSF heads 10 for dual-side, opposed-head recording on a flexible diskette will be found very satisfactory and superior in stability and the other respects mentioned above. In particular, no inlet "pinch-off" will be observed and an extremely stable air-bearing/disk relation will be observed, even with moderate velocity and miniscule head spacing (e.g., on the order of 10 microinches). Moreover, the "spherical-flat" contour is observed to afford a convenient way to minimize "head spacing" (distance between read/write core and media). Thus, as indicated schematically in FIG. 9, the read/write elements may be placed at the tangency point contemplated in operation (this being the point on spherical-flat surface SF, that is tangent to plane T—T the plane parallel to the surface of the passing medium M—it being understood that heads A and B are thrust conventionally into symmetrical opposing relation by respective thrust means P-P, P-P' applied at a suitable point as is known in the art.—Note: the thrust P-P, P-P' can be applied to induce the heads to "fly themselves" and assume a desired pitch angle with respect to the passing medium M).

This technique of using convex air-bearing curvatures to minimize head spacing distances will be understood by workers in the art. Workers will also be interested in the fact that one can use any kind of core elements in such an embodiment and can dispose them at will.

Here, it may be understood that the heads are magnetically similar to a spherical or button head; for instance, as indicated in U.S. Pat. No. 4,074,331 (cited above) in that the read/write element consists in one read/write core surrounded by two tunnel erase cores. Such an arrangement will be understood as evidently providing enhanced "roll-stability" and, for a given mode and rail width, is observed to accommodate a closer localized head spacing (at the core). This is evidently aided by the "transverse curvature" (i.e., "side-to-side" as well as "forward-to-aft").

FIG. 8A schematically illustrates this reduced local slider/disk spacing (with equal loads and rail widths assumed). That is, a pair of conventional flat-faced heads V, V' are shown as presented opposingly on both sides of a passing flexible disk segment F-D—these being compared with a pair of TSF-faced heads 10, 10' (FIG. 8B) similarly opposed about a like flexible disk segment (the loading forces F and the rail widths W for both catamaran heads being understood as the same). Quite interestingly, it is observed that the "TSF" heads may be presented closer to the passing disk, thus improving read/write efficiency (note minimum spacing $h_3$ for heads 10, 10' is less than minimum spacing $h_1$ for heads V, V').

Alternative embodiments:

Workers will recognize that the foregoing principles of the invention may be modified to produce alternative embodiments. For instance, it should be understood that in certain cases it will be feasible to use such a TSF catamaran head for single-sided recording of flexible disks (or tape) with a relatively large TSF head confronting the passing medium on one side and an equally large flat back-up surface opposed to the TSF head on the other side of the medium as a back-up surface. In any event, it will be assumed that such embodiments, when implemented as a catamaran head, will include an air-bearing surface (rail face) characterized by a flat "entry-taper" together with a "spherical-flat" rail segment—defining "spherical flat" as characterized by a spherical or cylindrical, radius of at least 100 to 1000 inches.

Now, workers will compare the invention, and the TSF head face with conventional "taper-flat" (TF) faced heads. For instance, TF heads will be viewed as inducing a relatively "stable" air-bearing as used with rigid disk media traveling at "higher" velocities (e.g., 1000 ips or more). However, they are relatively unstable at low velocities (e.g., "hunting"; "nosing-down"). They are also unstable when used with flexible disks—e.g., in "dual sided" recording they allow the floppy disk to undulate to the point when the (TF) head pitches over on its nose and "pinches-off" the air-bearing. By contrast, a TSF head as described, provides the first genuinely stable head for overflying flexible disks in "dual sided", opposed head recording, at moderate speeds.

It will be understood that the preferred embodiments described herein are only exemplary, and that the invention is capable of many modifications and variations in construction, arrangement and use without departing from the spirit of the invention. For example, the means and methods disclosed herein are also applicable to other like forms of flexible media. Also, this invention is believed applicable for providing improved transducer-flexible media relation in other like forms of recording and/or reproducing systems, such as those in which data is recorded and reproduced electrostatically, optically, etc.

The above examples of possible variations of the present invention are merely illustrative. Accordingly, the present invention is to be considered as including all possible modifications and variations coming within the scope of the invention as defined by the appended claims.

What is claimed is:

1. A recording arrangement comprising a pair of opposed recording means adapted to be translated relative to prescribed flexible media, while recording or detecting data indicia thereon, each recording means being disposed on one respective side of the intermediate medium and comprising improved air-bearing surface means that is adapted to be flown above said flexible media and at relatively close tolerances thereabove, this surface means being characterized by a pair of opposed edge surfaces, each surface comprising a relatively flat, tapered entry-segment and an adjacent "spherical-flat" working-segment, said working segments being relatively identically curved and accommodating transducer means, whereby low-velocity stability is enhanced and "head crash" is alleviated.

2. The combination as recited in claim 1, as part of a read/write head including at least two slider rails with one along each aerodynamic edge of the recording means and whereby the edge surfaces comprise the medium-confronting edges of the outer two rails, such surfaces being characterized as tapered and "spherical-flat".

3. The combination as recited in claim 2, wherein each said medium-confronting rail edge surface is characterized by a flat beveled entry-taper portion abutted by a "spherical-flat" portion downstream therefrom.

4. The combination as recited in claim 3, wherein said "spherical-flat" surfaces are understood as having a radius of about 100 inches or more, and are cut "spherical-flat" or "cylindrical-flat", at least adjacent said taper portion.

5. The combination as recited in claim 1, as part of a dual magnetic transducer assembly for transducing information upon a flexible magnetic recording surface of said media during relative movement between the transducer assembly and this recording surface, each such assembly comprising:
at least one magnetic slider body, each said body including at least two outer elongate slider rails having spaced apart elongate record-confronting edge surfaces defining the edges of the aerodynamic surface;
these confronting surfaces being configured in "Taper/Spherical-flat" form for improved air-bearing characteristics; and
a magnetic core aligned along at least one of said "spherical-flat" rail surfaces and adapted for read/write relation with said media.

6. The combination as recited in claim 5, wherein said record-confronting rail edge surfaces are substantially co-planar, and provide substantially the entire effective air-bearing surface for each said slider-body.

7. The combination as recited in claim 1, as part of a dual magnetic recording head assembly for transducing information on opposite surfaces of a flexible record segment, each such assembly comprising:
at least one magnetic recording head having a prescribed recording face adapted to be presented in air-bearing relation with said record member, at least the outer edge portions of said face being characterized by a flat entry-taper surface and, downstream therefrom, a "spherical-flat" working surface; and
means for supporting and positioning each of said recording heads operatively adjacent said record segment.

8. The combination as recited in claim 7, wherein said assembly is characterized by a pair of directly-opposed, confronting magnetic recording heads, each having their taper/"spherical-flat" surfaces opposed about an intervening flexible record member and including means for supporting and positioning each recording head operatively adjacent the intermediate flexible recording member in symmetrical opposition.

9. The combination as recited in claim 1, wherein each opposing surface means is provided as the media confronting face of a magnetic recording head adapted to be flown, at moderate speeds, over a flexible recording disk.

10. The combination as recited in claim 9, as adapted for use with media traveling at low to medium velocity, less than about 1000 in/sec with conventional disks.

11. The combination as recited in claim 9, wherein said face includes two or more slider rails, with two outer rails defining the said air-bearing surface means and each outer rail including an entry-taper portion, and an adjacent "spherical-flat" portion.

12. The combination as recited in claim 11, wherein said "spherical-flat" portion extends downstream to adjacent the exit-portion of each face.

13. The combination as recited in claim 1, wherein each said face is configured into a large-radius spherical, or cylindrical, configuration having a minimum radius of curvature of approximately 100 inches.

14. The combination as recited in claim 13, wherein said radii are cut to be from about 100 inches to about 1,000 inches.

15. A dual magnetic recording assembly for recording information on at least one side of a flexible record member comprising a pair of opposed aerodynamic heads, each head including a pair of lateral flying surfaces defining the flying edges thereof, each such "flying edge" comprising an entry taper portion and an adjacent "spherical-flat" portion; these heads being positioned and disposed in direct opposition so as to present said entry and "spherical-flat" portions in opposed confronting relation about the intervening flexible record medium whereby low-velocity stability is enhanced and "head crash" is alleviated.

* * * * *